Patented July 22, 1924.

1,502,035

UNITED STATES PATENT OFFICE.

PETER HASENCLEVER, OF HAMBURG-BILLWARDER, GERMANY.

PROCESS FOR PREPARING CRYSTALS OF CHROME ALUM.

No Drawing.    Application filed November 11, 1922. Serial No. 600,451.

*To all whom it may concern:*

Be it known that I, PETER HASENCLEVER, a citizen of Germany, residing at 29 Billbrookdeich, Hamburg-Billwarder, Germany, have invented certain new and useful Improvement in Processes for Preparing Crystals of Chrome Alum, of which the following is a specification.

The present invention refers to preparing crystals of chrome alum.

It is known to manufacture chrome alum by mixing solutions of chromium sulphate with potassium sulphate. It is necessary that the said solutions stand for a longer time, as for several weeks in order that the so called green modification which is un-crystallizable may turn into the violet modification of chrome alum which is crystallizable. For accelerating this transformation one has proposed to add to the solution of chrome alum nitric acid, sulphurous acid or sulphites.

The present process consists in that one adds to the solutions of green chrome alum potassium dichromate, sulphurous acid and sulphites. The green modification of chorme alum turns nearly at once into the violet modification at low temperature so that at suitable temperature and concentration the crystals of chrome alum are formed at once or very quickly. A characteristic advantage of the process is that the conversion of the green modification of chrome alum into the violet modification takes place suddenly and nearly instantly.

The present process is especially apt for preparing crystals of chrome alum from solutions containing ferrous compounds, for instance from solutions of ferrochromium in sulphuric acid. Suitably one adds only such amounts of dichromates that the ferrous compounds are not oxidized to ferric compounds. If however the ferrous compounds should be oxidized to ferric compounds the sulphurous acid will effect a reduction. The sulphurous acid may be introduced into the solution while or after the addition of potassium dichromate and sulphuric acid. The amount of the sulphuric acid is suitably so taken that it may form with the whole amount of potassium in the potassium bichromate, potassium sulphate.

An explanation of the present process cannot be given. Probably from the potassium dichromate in the presence of the sulphuric acid by the action of sulphurous acid at once violet chrome alum is formed which in "statu nascendi" transforms at once the green chrome alum into the violet modification.

In the case that the solutions contain ferrous compounds the latter remain in solution in larger proportion than if one adds potassium sulphate to the solutions without the additions of the present process.

*Example.*

1000 kilograms ferrochromium, preferably in large lumps or blocks as the material comes from the manufacturer, are dissolved in about 3000 kilograms concentrated sulphuric acid, so that the sulphuric acid is nearly completely neutralized. One may subject the solution consisting of chromium sulphate and ferrous sulphate to a crystallization process in order to remove a part of the ferrous sulphate, about one half. The liquid may be separated from the crystals for instance by centrifuging and is now treated with potassium sulphate, in such proportions that the whole amount of chromium sulphate may be transformed into chrome alum. The addition is preferably made while the solution is hot, whereupon the liquid is cooled and then treated with about 10 kilograms potassium dichromate and about 3 kilograms concentrated sulphuric acid. Sulphurous acid is then introduced into the liquid. The conversion of the green modification of the chrome alum into the violet modification may be soon observed. After short time the crystallization of chrome alum will be observed. The crystals of chrome alum obtained by the present process are generally larger and better shaped than those obtained according to the known slow processes of conversion of the green modification into the violet.

I claim:

1. The process for preparing crystals of chrome alum which consists in adding potassium dichromate, sulphuric acid and sulphurous acid to solutions of chrome alum and crystallizing.

2. The process for preparing crystals of chrome alum which consists in adding potassium dichromate, sulphuric acid and sulphurous acid to solutions of chrome alum prepared by dissolving ferrochromium in sulphuric acid, to which has been added potassium sulphate, and crystallizing.

In testimony whereof I hereunto affix my signature.

PETER HASENCLEVER.